United States Patent
Doinoff et al.

(10) Patent No.: US 8,640,813 B2
(45) Date of Patent: Feb. 4, 2014

(54) IGNITION INTERLOCK DEVICE WITH ROLLING RETEST AND MOTION DETECTOR

(76) Inventors: Nicholas G. Doinoff, North Lima, OH (US); Walter B. Lotz, Jr., Summerfield, FL (US)

( * ) Notice: Subject to any disclaimer, the term of this patent is extended or adjusted under 35 U.S.C. 154(b) by 0 days.

(21) Appl. No.: 13/591,596

(22) Filed: Aug. 22, 2012

(65) Prior Publication Data

US 2013/0048403 A1 Feb. 28, 2013

Related U.S. Application Data

(60) Provisional application No. 61/526,869, filed on Aug. 24, 2011.

(51) Int. Cl.
*B60K 28/06* (2006.01)

(52) U.S. Cl.
USPC .......................................... 180/272; 340/576

(58) Field of Classification Search
USPC .............................. 180/272; 340/576; 422/84
IPC ....................................................... B60K 28/06
See application file for complete search history.

(56) References Cited

U.S. PATENT DOCUMENTS

| | | | |
|---|---|---|---|
| 3,780,311 A | 12/1973 | Brown | |
| 5,219,413 A | 6/1993 | Lineberger | |
| 7,031,835 B2 | 4/2006 | Flick | |
| 7,341,693 B2 | 3/2008 | Der Ghazarian et al. | |
| 7,343,244 B2 | 3/2008 | Flick | |
| 7,413,047 B2 | 8/2008 | Brown et al. | |
| 7,451,852 B2 | 11/2008 | Stewart et al. | |
| 7,823,681 B2 * | 11/2010 | Crespo et al. | 180/272 |
| 8,240,419 B2 * | 8/2012 | Zimmermann et al. | 180/272 |
| 2003/0036823 A1 * | 2/2003 | Mahvi | 701/1 |
| 2005/0241871 A1 * | 11/2005 | Stewart et al. | 180/272 |
| 2006/0202842 A1 * | 9/2006 | Sofer | 340/576 |
| 2006/0237252 A1 | 10/2006 | Mobley et al. | |
| 2006/0237254 A1 * | 10/2006 | Mobley et al. | 180/272 |
| 2009/0090577 A1 | 4/2009 | Takahashi et al. | |
| 2009/0293589 A1 | 12/2009 | Freund et al. | |
| 2010/0010689 A1 * | 1/2010 | Yasushi et al. | 701/1 |
| 2010/0121502 A1 | 5/2010 | Katayama et al. | |
| 2010/0294583 A1 | 11/2010 | Biondo et al. | |
| 2010/0314190 A1 | 12/2010 | Zimmermann et al. | |

FOREIGN PATENT DOCUMENTS

| | | |
|---|---|---|
| GB | 1374141 | 11/1974 |
| GB | 2361343 A | 10/2001 |

(Continued)

*Primary Examiner* — Ruth Ilan
(74) *Attorney, Agent, or Firm* — McNees Wallace & Nurick LLC

(57) ABSTRACT

A breath alcohol ignition interlock device. The breath alcohol interlock device includes an ignition interlock system for use with a vehicle, the interlock system requiring a successful breathalyzer test to initiate operation of a motor of the vehicle, the interlock system including a CPU. A vehicle computer that controls functions of the vehicle related to motion receives a signal from the interlock system of a successful breathalyzer test to permit operation of the motor vehicle. A motion detection device associated with the vehicle determines when the vehicle is placed into motion. The motion detection device provides a signal to the CPU of the ignition interlock system when vehicle motion is detected. The CPU of the ignition interlock system initiates a breathalyzer retest algorithm upon receiving a signal from the motion detection device that the vehicle is placed in motion.

16 Claims, 3 Drawing Sheets

(56) References Cited

FOREIGN PATENT DOCUMENTS

| | | | |
|---|---|---|---|
| JP | 2005118177 A | 5/2005 | |
| JP | 2009143438 A | 7/2007 | |
| JP | 2008121654 A | 5/2008 | |
| JP | 20091101 A | 1/2009 | |
| JP | 20091102 A | 1/2009 | |
| JP | 200923545 A | 2/2009 | |
| JP | 201047055 A | 3/2010 | |
| JP | 2010167826 A | 8/2010 | |
| WO | 2008073030 A1 | 6/2008 | |

* cited by examiner

IGNITION INTERLOCK DEVICE WITH ROLLING RETEST AND MOTION DETECTOR

CROSS-REFERENCE TO RELATED APPLICATIONS

This application claims the benefit of and priority to U.S. Provisional Application Ser. No. 61/526,869 entitled IGNITION INTERLOCK DEVICE WITH ROLLING RETEST AND MOTION DETECTOR filed on Aug. 24, 2011.

FIELD OF THE INVENTION

The present invention is generally directed to ignition interlock devices used to monitor breath alcohol content of a vehicle driver, and specifically to ignition interlock devices used in vehicles to monitor drivers usually having DUI convictions, the devices requiring rolling retests when the vehicle is in motion, the drivers usually retaining special operator's driving privileges under court-ordered or other jurisdictional mandates and supervision.

BACKGROUND OF THE INVENTION

Various interlock devices exist to prevent operation of a mechanical apparatus when an operator is mentally and/or physically impaired as a result of consumption of alcoholic beverages. These devices utilize a breath alcohol analyzer device, which determines an alcohol level in an individual's breath that is correlated to the alcohol level in the bloodstream. This determination controls the decision as to whether or not the ignition interlock permits the device or apparatus to engage and start. Most frequently, these interlock devices are utilized on automobiles.

Many of the interlock systems available today can ascertain whether a certain predetermined breath alcohol reading limit of the person exhaling into the breath alcohol analyzer device, preset into the device, has been exceeded or not prior to starting the vehicles. The vehicle interlock systems also may require a retest once the vehicle has been started to ascertain that an operator has not consumed any alcoholic beverages after the vehicle has been started as well as to ascertain whether a driver's breath alcohol has risen above a predetermined interlock setpoint. Depending on the system, the retest may be required at regular intervals or at random intervals dictated by the system and its programming.

One of the problems with current ignition interlock systems and the rolling retest is that if the retest is not performed within a predetermined time interval after notification of the operator that a retest is required, the ignition interlock systems will result in a warning, indicating the need for a retest. Depending on the programming of the interlock system, if the retest is not performed within a prescribed time limit, a warning is triggered, such as a blowing horn, flashing lights, or both, or the interlock system directing the operator or report directly to a service center, presumably for an early service visit. This poses problems for a person subject to use of an ignition interlock system on very hot or very cold days, particularly if the person is subject to legal sanctions. Typically a person not subject to use of a judicially ordered ignition interlock system may start their vehicle, in some cases remotely, and remain indoors on hot or cold days while the temperature in the vehicle equalizes to a more comfortable temperature. Then they may exit their shelter and enter the vehicle, which is at a more temperate temperature. However, an ignition interlock system, such as ones installed as a result of a judicial order, precludes an operator from starting their vehicle and returning to their shelter while the vehicle achieves a more temperate temperature because a retest may be required while the vehicle is achieving a more temperate temperature reading. If the vehicle operator is not available for the retest, the ignition interlock system may institute one of the previously described warnings. What is needed is an ignition interlock system that permits a driver to start the vehicle so that the vehicle may run without the driver's presence in the vehicle so that the vehicle engine may reach operating temperature or so that the interior of the vehicle may achieve a more moderate temperature.

BRIEF DESCRIPTION OF THE INVENTION

The present invention overcomes the infirmities of the prior art ignition interlock systems by utilizing a motion detector with the ignition interlock system. An accelerometer may be used for this application, although an accelerometer measures a change in acceleration. Here, any movement of a vehicle at rest to any velocity will be recognized by the accelerometer as an increase in velocity, which is acceleration. While an accelerometer can accurately detect a change in velocity motion, any other device that detects motion may be used.

The motion detector may be included as an integral feature in the ignition interlock system. Alternatively, the ignition interlock system may include circuitry that permits a motion detector, such as an accelerometer, to be linked to the ignition interlock system. In its broadest embodiment, a motion detector is envisioned to include not only an instrument such as an accelerometer, but also a global positioning system (GPS) that can not only determine a position of a vehicle, but also can detect a change in a vehicle's position, which is a positive indication of vehicular motion. In the later case, the motion detector, such as an accelerometer or a GPS, may be positioned anywhere in the vehicle and wired to the ignition interlock system. The motion detector, such as an accelerometer or GPS, also may include a transmitter to permit it to be placed anywhere in the vehicle to enable communication with the interlock system, which includes a receiver tuned to receive a signal from the motion detector. In this embodiment, the a motion detector such as an accelerometer may require a battery to operate the accelerometer and the transmitter. The motion detector, such as an accelerometer, and the transmitter also may include a rechargeable battery that is wired to the vehicle so that the vehicle battery may continuously charge the rechargeable battery, eliminating the need to periodically replace the battery.

The present invention as set forth above solves the problem of starting the vehicle and running the vehicle to allow it to reach a desirable operating temperature. This invention allows a vehicle with an ignition interlock system to be started after passing an initial test so that engine operating temperature may be achieved or heating or cooling the vehicle to a more temperate temperature without retest can be accomplished and without activating one of the previously described warnings while the vehicle is idling to achieve the more temperate temperature.

One of the advantages of the present invention is that the driver will not be subject to discomfort as the interior of the vehicle reaches a more suitable operating temperature.

Another advantage is that no false warnings will be initiated by the ignition warning system. A related advantage is that no erroneous record will be recorded indicating that the driver may have violated operational requirements of the ignition interlock system.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
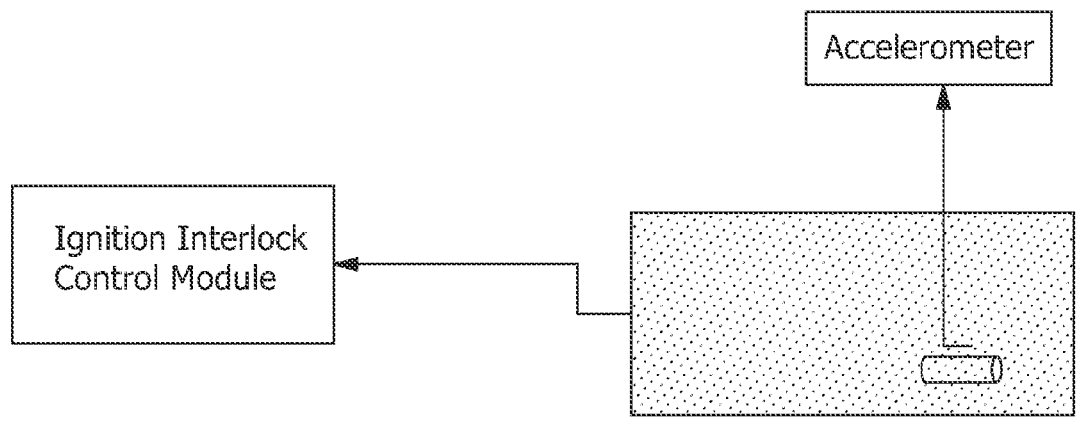
FIG. 1 is a general depiction of the ignition interlock logic of the present invention.

The ignition interlock device logic with rolling retest and motion detector of the present invention is generally depicted in FIG. 1. In operation, to start the vehicle, the operator must perform a breathalyzer test in accordance with normal procedures dictated by the ignition interlock device, which includes a CPU. However, the motion detector, such as an accelerometer or GPS, permits the operator to then leave the vehicle. As long as the motion detector, such as an accelerometer or GPS, does not detect vehicle motion, the vehicle engine will be allowed to operate, so that the vehicle interior can be heated or cooled in accordance with the vehicle temperature settings, or alternatively, the engine of the vehicle can be allowed to reach operational temperature. However, as soon as the vehicle is set into motion, the motion detector, such as an accelerometer or GPS, sends a signal to the ignition interlock control module, which is programmed to demand a retest from the operator within a predetermined amount of time after receiving the signal from the motion detector, such as an accelerometer or GPS. This retest will be hereinafter referred to as a "rolling retest," even though due to the random nature or periodic timing of the test, the vehicle may be temporarily at rest with the engine operation.

If the rolling retest is not performed by the operator within the predetermined amount of time, the ignition interlock device will activate the warnings within a predetermined amount of time in accordance with established programming. These warnings may include flashing of the vehicle lights, honking of the vehicle horn or a warning with instructions to the driver to report to a Service Center operated by state or local law enforcement. A signal of the violation may also be provided by the ignition interlock system to a Service Center or other authorized recipient of the violation.

Once the first rolling retest is performed, the ignition interlock device may require additional rolling retests as determined by the ignition interlock device programming, which may be at predetermined time intervals, at random time intervals or using some alternative algothithm programming into the logic of the ignition interlock system.

There are other embodiments that are envisioned by this invention that can technically be implemented, although a change in law to permit their implementation may be required. Since the motion detector, such as an accelerometer, immediately signals the ignition interlock device that a vehicle is in motion, it may be possible to remotely start a vehicle without the need for even an initial breathalyzer test. However, the breathalyzer test may be required as soon as the motion detector detects motion. Failure to provide a successful breathalyzer test within the prescribed period of time could result in activation of warning systems, such as one or more of the warnings previously described.

In another embodiment, an alternate scheme may be used. Since most vehicles built in recent years are controlled by computers, including transmission gearing or alternatively parking brake function, it is possible to provide an ignition interlock system that can be mated to the computer transmission algorithm or to the parking brake function. As long as the vehicle transmission is in the PARK position, or as long as the parking brake remains engaged, the vehicle may be started remotely or even with the operator in the vehicle. The motor will remain running as long as the vehicle transmission is in the PARK position, or for manual transmission vehicles for example, the parking brake remains engaged. This will allow the operator to start the vehicle, even remotely, while the interior of the vehicle achieves a more temperate temperature.

As soon as the ignition interlock system determines that the vehicle transmission has been moved from the PARK position, or when the brake is applied to move the transmission from the PARK position, which also usually requires depressing the brake pedal, or the parking brake has been released, the ignition interlock system will require that a breathalyzer test be performed. The computer logic will control the fuel flow so that no fuel will be provided to the engine by operation of the accelerator until the breathalyzer test is performed. The computer will not allow the brake to be disengaged, or the vehicle's transmission will remain in the PARK position, until the breathalyzer test is successfully performed. If the breathalyzer test is not performed within the prescribed time or performed unsuccessfully, the previously described warnings may be activated, or, if the vehicle is not in motion, as detected by the motion detector, the vehicle may not be permitted to institute motion, either by not allowing fuel into the fuel system, not releasing the brakes, not allowing the transmission to be removed from the park position or some other action that can be taken by the vehicle's computer, as instructed by the interlock device.

Once the breathalyzer test is performed successfully, the brake will be released, the transmission will be permitted to be moved from PARK, the accelerator will operate in a normal fashion and the ignition interlock device will require additional rolling retests as determined by the ignition interlock device programming, which may be at predetermined time intervals, at random time intervals or using some alternative algorithm. Alternatively, a motion detector, such as an accelerometer, may detect motion and provide a signal to the ignition interlock device to perform rolling retests as determined by the ignition interlock device programming. The prior examples are illustrative of the various methods available to permit an ignition interlock system of a vehicle to interact with a motion detector to mandate a breathalyzer rolling retest in a moving vehicle or to mandate an initial breathalyzer retest after initial vehicle start-up, but before placing the vehicle in motion, and in certain circumstances by interfacing with the vehicle's computer.

Figure 2:
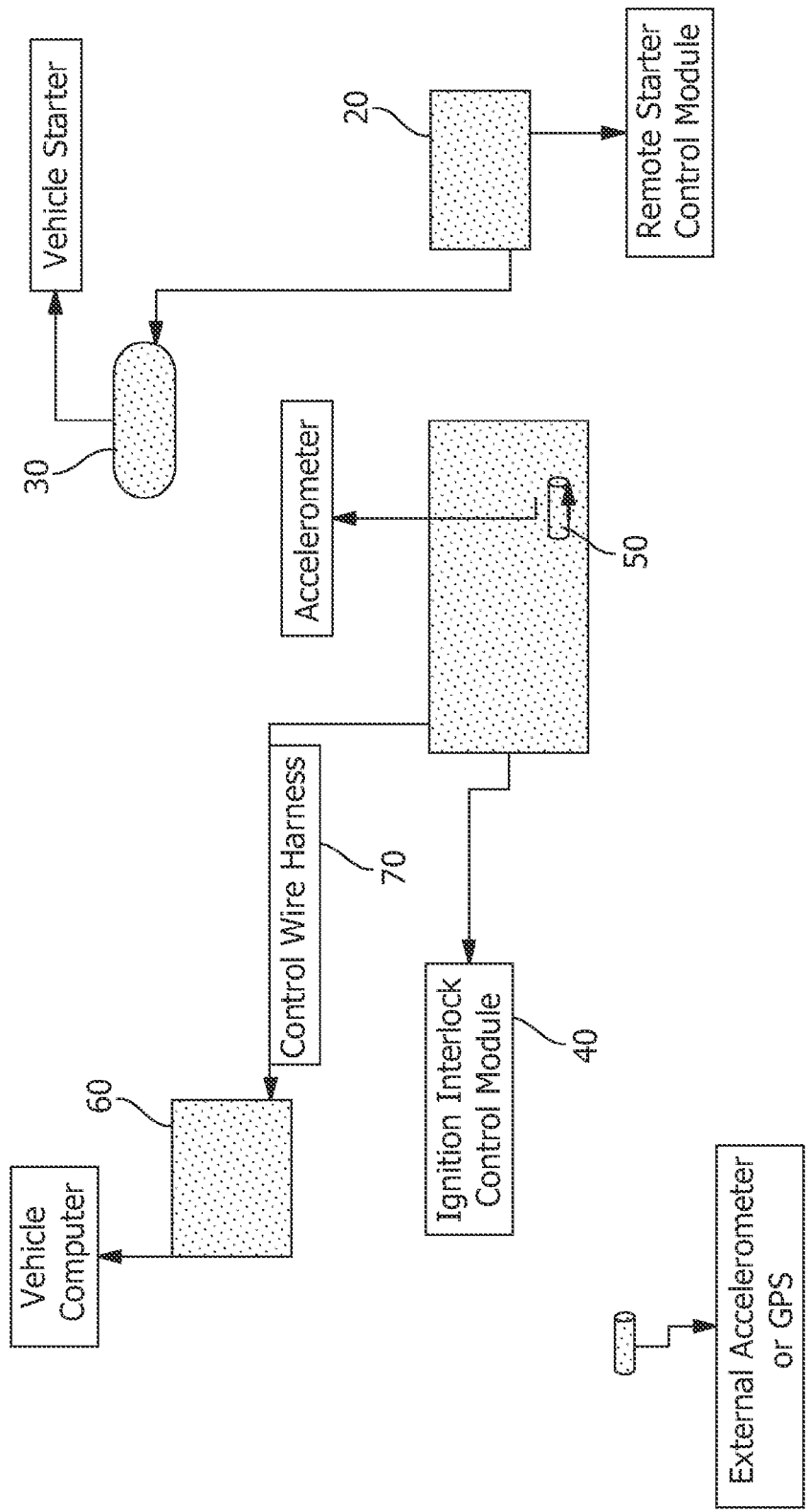
FIG. 2 is an embodiment of the ignition interlock logic of the present invention that also utilizes a remote start function.

FIG. 2 is a more detailed schematic of an embodiment of FIG. 1. In FIG. 2, a remote start control module 20 is in communication with the vehicle starter 30. This enables the vehicle to be started remotely, much like any other remote start device. However, the vehicle also includes an ignition interlock control module 40 and a motion detector 50, both in communication one another and with the vehicle computer 60. Communication may be through a control wire harness 70. Even though the engine of the vehicle may have been activated by remote start device 20, the ignition interlock control module which is in communication with vehicle computer 60, will not allow the vehicle to be operated until a successful breathalyzer test has been performed as signaled by ignition control module 20 of the ignition interlock system. Once a successful breathalyzer test is performed, the ignition interlock control module 40 will signal the vehicle computer to allow vehicle operation, removing whichever impediments on vehicle operation have been programmed. Once the vehicle is placed in motion, the motion detector 50, which may be an accelerometer or a GPS, will signal ignition interlock control module 40 that motion has been detected, resulting in interlock control module 40 activating preprogrammed timing for performance of the rolling retest, returning the ignition interlock control module 40 to normal operation.

Figure 3:
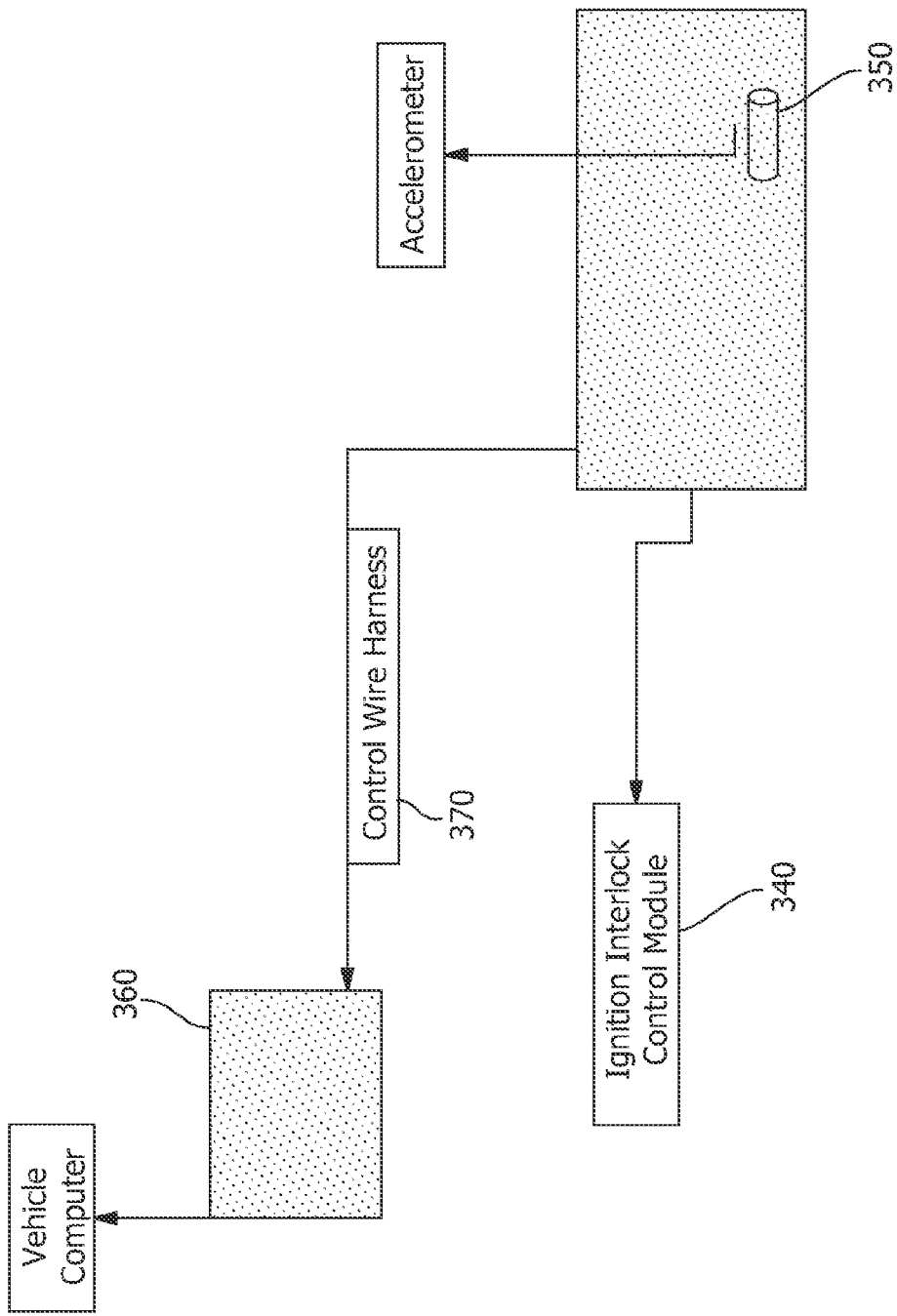
FIG. 3 is an embodiment of the ignition interlock logic of the present invention that does not utilize a remote start function.

FIG. 3 is a modification of FIG. 1, but is somewhat simpler and cheaper than the modification disclosed in FIG. 3. FIG. 3 depicts a simpler version of the FIG. 2 modification in that FIG. 3 does not include a remote start control module in communication with the vehicle starter. According to the embodiment depicted in FIG. 3, the ignition interlock control module 340 is in communication with the vehicle computer 360 and provides signals to vehicle computer 360 that control the starting of the vehicle. The interlock control module 340 may be in communication with the vehicle computer 360 via a control wiring harness 370, although the communication is not so restricted and may be accomplished in any manner such as, but not limited to RF signals. Before the vehicle can be started, an initial breathalyzer test must be successfully performed, at which time ignition interlock control module 340 will provide a signal to vehicle computer 360 to allow the engine to start. If the transmission is engaged immediately or within a predetermined amount of time after the initial breathalyzer test, for example 10-40 seconds, the vehicle will be allowed to be set into motion and the motion detector 350 will signal the ignition interlock control module 340 that the programming for rolling retest should be run. Other indications may also prevent activation of vehicle motion, such as, if the vehicle is so equipped, if a door is opened. If the vehicle is not set into motion because one of the indicators is set off, for example, lapse of time beyond a predetermined time or opening of a door, then the vehicle computer 360 will not permit vehicle motion to be initiated unless a signal of performance of an additional breathalyzer test is received from ignition interlock control module 340. Once a signal indicative of the performance of the additional breathalyzer test is received by vehicle computer 360 from ignition interlock control module 340, then the vehicle computer 360 will permit movement of the vehicle. Once vehicle motion is detected by motion detector 350, then a signal indicative of vehicle motion is sent to ignition interlock control module 340 to initiate the rolling restart programming.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A breath alcohol ignition interlock device, comprising:
   an ignition interlock system for use with a vehicle, the interlock system requiring a successful breathalyzer test to initiate operation of a motor of the vehicle, the interlock system including a CPU;
   a vehicle computer in communication with the ignition interlock system, the vehicle computer controlling vehicle functions related to motion, the vehicle computer receiving a signal from the interlock system of a successful breathalyzer test to permit motion of the motor vehicle;
   a motion detection device associated with the vehicle, the motion detection device determining when the vehicle is placed into motion, the motion detection device providing a signal to the CPU of the ignition interlock system when vehicle motion is detected; and
   wherein the CPU of the ignition interlock system initiates a breathalyzer retest algorithm upon receiving a signal from the motion detection device that the vehicle is placed in motion.

2. The breath alcohol ignition interlock device of claim 1 further including a remote start system in communication with the vehicle starter that enables starting of the vehicle remotely.

3. The breath alcohol ignition interlock device of claim 1 wherein the motion detector device is an accelerometer.

4. The breath alcohol ignition interlock device of claim 1 wherein the motion detector device is a GPS.

5. The breath alcohol ignition interlock device of claim 1 wherein the ignition interlock system is in communication with the vehicle computer, and wherein vehicle motion is prevented by the vehicle computer unless a signal is received from the ignition interlock system of the successful breathalyzer test.

6. The breath alcohol ignition interlock device of claim 5 wherein vehicle motion is prevented by the vehicle computer preventing engagement of the transmission.

7. The breath alcohol ignition interlock device of claim 5 wherein vehicle motion is prevented by the vehicle computer restricting fuel flow.

8. The breath alcohol ignition interlock device of claim 5 wherein vehicle motion is prevented by the vehicle computer maintaining application of the parking brake.

9. A method for remotely starting a vehicle equipped with an ignition interlock device with rolling retest, comprising the steps of:
   providing a vehicle equipped with a vehicle computer;
   providing an ignition interlock system in communication with the vehicle computer, the ignition interlock system including a rolling retest algorithm;
   providing a motion detection device in communication with the ignition interlock system;
   starting the vehicle;
   performing a breathalyzer test using the ignition interlock system;
   providing a signal from the ignition interlock system to the vehicle computer of a successful breathalyzer test, the vehicle computer enabling vehicle motion;
   providing a signal from the motion detection device to the ignition interlock system that vehicle motion is detected;
   activating the rolling retest algorithm.

10. The method of claim 9 wherein providing the motion detection device includes providing an accelerometer.

11. The method of claim 9 wherein providing the motion detection device includes providing a GPS.

12. The method of claim 9 wherein the step of starting the vehicle includes starting the vehicle remotely using a remote starting device in communication with the vehicle starter.

13. The method of claim 9 further including the additional steps of:

performing a breathalyzer test using the ignition interlock system prior to starting the vehicle;

providing a signal from the ignition interlock system to the vehicle computer of a successful breathalyzer test prior to starting the vehicle; and, after starting the vehicle, providing a signal from the ignition interlock system to the vehicle computer to prevent vehicle motion when a signal of vehicle motion is not detected by the motion detector and transmitted to the ignition interlock system within a predetermined time after starting the vehicle.

14. The method of claim 9 wherein the step of providing a signal to the vehicle computer enabling vehicle motion includes disengaging a transmission from PARK.

15. The method of claim 9 wherein the step of providing a signal to the vehicle computer enabling vehicle motion includes disengaging the parking brake.

16. The method of claim 9 wherein the step of providing a signal to the vehicle computer enabling vehicle motion includes activating sufficient flow of fuel from a fuel pump to the engine to enable motion.

\* \* \* \* \*